US009831949B2

(12) United States Patent
Matsukawa et al.

(10) Patent No.: US 9,831,949 B2
(45) Date of Patent: *Nov. 28, 2017

(54) MODULATION DEVICE, LIGHT EMITTING DEVICE, AND LIGHT EMISSION SYSTEM

(71) Applicant: Panasonic Intellectual Property Management Co., Ltd., Osaka (JP)

(72) Inventors: Yoshihiko Matsukawa, Nara (JP); Shojirou Kido, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/167,385

(22) Filed: May 27, 2016

(65) Prior Publication Data

US 2016/0359562 A1 Dec. 8, 2016

(30) Foreign Application Priority Data

Jun. 2, 2015 (JP) .................. 2015-112640

(51) Int. Cl.
*H04B 10/00* (2013.01)
*H04B 10/116* (2013.01)
*H05B 37/02* (2006.01)
*H04B 10/40* (2013.01)
*H04L 7/00* (2006.01)
*H04B 10/50* (2013.01)

(52) U.S. Cl.
CPC ........... *H04B 10/116* (2013.01); *H04B 10/40* (2013.01); *H04B 10/50* (2013.01); *H04L 7/0075* (2013.01); *H05B 37/0209* (2013.01)

(58) Field of Classification Search
CPC ...... H04B 10/116; H04B 10/40; H04B 10/50; H04L 7/0075; H05B 37/0209
USPC ........................................................ 398/118
See application file for complete search history.

(56) References Cited

U.S. PATENT DOCUMENTS

| 6,865,347 B2 | 3/2005 | Perkins et al. |
| 7,006,768 B1 | 2/2006 | Franklin |
| 8,457,502 B2 | 6/2013 | Ryan et al. |

(Continued)

FOREIGN PATENT DOCUMENTS

JP 2013-110599 A 6/2013

OTHER PUBLICATIONS

Non-Final Office Action issued in U.S. Appl. No. 15/160,089, dated Jun. 8, 2017.

(Continued)

*Primary Examiner* — M. R. Sedighian
(74) *Attorney, Agent, or Firm* — McDermott Will & Emery LLP

(57) ABSTRACT

A modulation device includes a modulator circuit that causes a light source to perform light communication, storage storing an internal ID, and a control circuit that determines whether an external ID is input into the modulation device. When the control circuit determines that the external ID is input into the modulation device, the control circuit causes the input external ID to be input, as a modulation signal, into the modulator circuit. When the control circuit determines that the external ID is not input into the modulation device, the control circuit causes the internal ID stored in the storage to be input, as a modulation signal, into the modulator circuit.

9 Claims, 16 Drawing Sheets

(56) References Cited

U.S. PATENT DOCUMENTS

| | | |
|---|---|---|
| 8,660,436 B2 | 2/2014 | Schenk et al. |
| 8,866,391 B2 | 10/2014 | Ganick et al. |
| 9,014,564 B2 | 4/2015 | Roberts et al. |
| 9,166,685 B2 | 10/2015 | Kido et al. |
| 2010/0254712 A1 | 10/2010 | Linnartz et al. |
| 2013/0028612 A1 | 1/2013 | Ryan et al. |
| 2013/0141554 A1 | 6/2013 | Ganick et al. |
| 2013/0272717 A1 | 10/2013 | Deguchi et al. |
| 2013/0336662 A1* | 12/2013 | Murayama ........... H04B 10/116 398/130 |
| 2014/0139744 A1 | 5/2014 | Ryan et al. |
| 2014/0199082 A1 | 7/2014 | Iizuka |
| 2014/0321860 A1 | 10/2014 | Kido et al. |
| 2015/0304031 A1* | 10/2015 | Lee ..................... H04B 10/516 398/118 |
| 2015/0372753 A1 | 12/2015 | Jovicic et al. |

OTHER PUBLICATIONS

Notice of Allowance issued in U.S. Appl. No. 15/160,089, dated Sep. 1, 2017.

* cited by examiner

MODULATION DEVICE, LIGHT EMITTING DEVICE, AND LIGHT EMISSION SYSTEM

CROSS REFERENCE TO RELATED APPLICATION

This application claims the benefit of priority of Japanese Patent Application Number 2015-112640 filed on Jun. 2, 2015 the entire content of which is hereby incorporated by reference.

BACKGROUND

1. Technical Field

The present disclosure relates to a modulation device, light emitting device, and light emission system, and in particular to a modulation device used for light communication such as visible light communication.

2. Description of the Related Art

In light emission systems such as an electronic sign including a plurality of light emitting devices capable of light communication such as visible light communication, the plurality of light emitting devices are required to transmit the same identification information (ID) in synchronization. This is because even a light communication reception device located in a region in which light from the plurality of light emitting devices overlaps needs to be able to receive a single ID without failure.

Conventionally, various techniques have been proposed regarding such a light emission system (for example, see Japanese Unexamined Patent Application Publication No. 2013-110599). In Japanese Unexamined Patent Application Publication No. 2013-110599, a plurality of lighting devices are connected to a common visible light communication signal output device, and the plurality of lighting devices receive a single ID from the visible light communication signal output device and emit visible light at the same time. Accordingly, the plurality of lighting devices can transmit the same ID in synchronization via visible light communication.

SUMMARY

However, with the techniques disclosed in Japanese Unexamined Patent Application Publication No. 2013-110599, the plurality of lighting devices included in the light emission system require the visible light communication signal output device, and cannot transmit the ID themselves alone. Stated differently, with the techniques disclosed in Japanese Unexamined Patent Application Publication No. 2013-110599, there are problems in that the plurality of lighting devices can only be used as elements in the light emission system, and cannot be used as standalone devices that transmit IDs themselves via visible light communication, and therefore lack convenience (lack versatility).

Accordingly, the present disclosure has an object to provide a modulation device suitable for a light emitting device convenient due to its capability of being used not only as an element in a light emission system, but also as a standalone device that transmits IDs on its own via light communication.

In order to achieve the above object, in one aspect, a modulation device according to the present disclosure causes a light source to perform light communication, and includes: a modulator circuit that modulates a magnitude of current supplied to the light source to cause the light source to perform light communication; storage storing an internal ID, the internal ID being self-identification information; and a control circuit that determines whether an external ID is input into the modulation device, the external ID being identification information supplied from an external source. When the control circuit determines that the external ID is input into the modulation device, the control circuit causes the external ID to be input, as a modulation signal, into the modulator circuit, and when the control circuit determines that the external ID is not input into the modulation device, the control circuit causes the internal ID stored in the storage to be input, as a modulation signal, into the modulator circuit. The modulator circuit modulates the magnitude of current in accordance with the modulation signal input into the modulator circuit.

Moreover, in order to achieve the above object, in one aspect, a light emitting device according to the present disclosure includes a light source; the above-described modulation device that causes the light source to perform light communication; and a power supply that supplies power to the modulation device.

In order to achieve the above object, in one aspect, a light emission system according to the present disclosure includes a plurality of light emitting devices including at least a first light emitting device and a second light emitting device, each of the first light emitting device and the second light emitting device being the above-described light emitting device, and the first light emitting device and the second light emitting device are connected together so as to cause the internal ID stored in the storage of the first light emitting device to be input into the modulator circuit of the first light emitting device and the internal ID to be input as an external ID in the second light emitting device.

According to the present disclosure, a modulation device can be achieved that is suitable for a light emitting device convenient due to its capability of being used not only as an element in a light emission system, but also as a standalone device that transmits IDs on its own via light communication.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Hereinafter exemplary embodiments will be described in detail with reference to the drawings. The exemplary embodiments described below are preferred specific examples. The numerical values, shapes, materials, elements, the arrangement and connection of the elements, steps, the order of the steps, etc., in the following exemplary embodiments are mere examples, and therefore are not intended to limit the inventive concept. Therefore, among the elements in the following exemplary embodiments, those not recited in any of the independent claims defining the most generic part of the inventive concept are described as arbitrary elements for achieving a more preferable embodiment.

Embodiment 1

First, the light emitting device according to Embodiment 1 of the present disclosure will be described.

Figure 1:
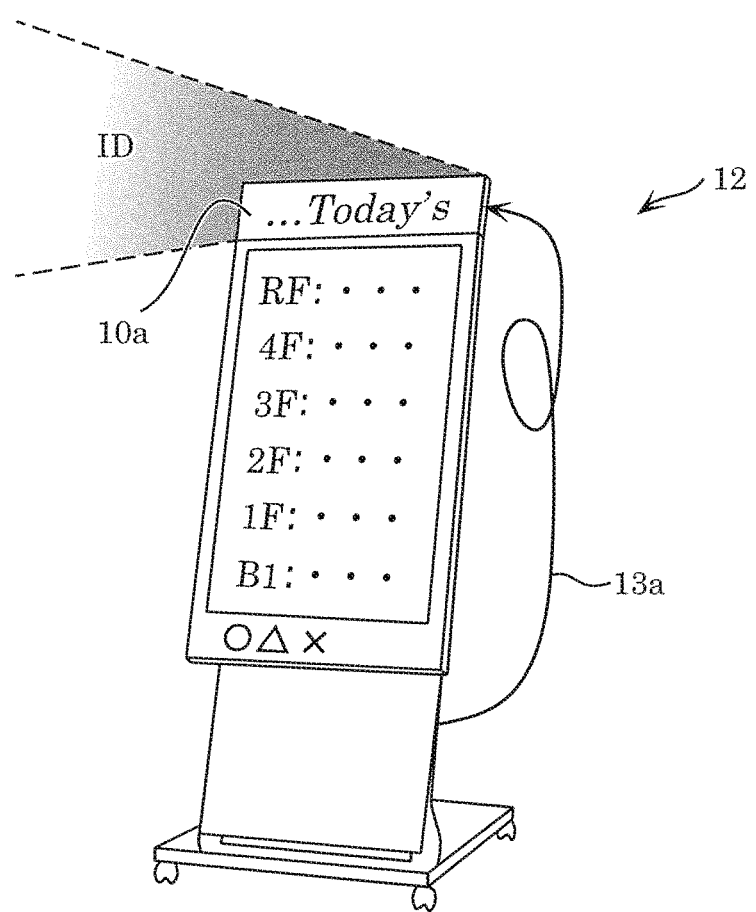
FIG. 1 illustrates a usage example of a light emitting device according to Embodiment 1.

FIG. 1 illustrates a usage example of light emitting device 10a according to Embodiment 1. In the example illustrated, light emitting device 10a is provided at the top portion of electronic sign 12, and signal line 13a for inputting an ID from an external source (i.e., an external ID) into light emitting device 10a is connected to light emitting device 10a. Light emitting device 10a is, for example, a light emitting device capable of performing visible light communication, and is recognizable to a person as an electronic sign or lighting device.

As illustrated, when an external ID is input via the connected signal line 13a, light emitting device 10a transmits the input external ID via light communication. However, during a period in which the external ID is not received through signal line 13a or when signal line 13a is not connected to light emitting device 10a, light emitting device 10a transmits an ID generated internally (i.e., an internal ID) via light communication. With this, the ID transmitted from light emitting device 10a by light communication can be changed in accordance with whether signal line 13a is connected to light emitting device 10a, or whether an external ID is input into light emitting device 10a via signal line 13a. Accordingly, switching between causing light emitting device 10a to function as a master device that transmits the internal ID via light communication and causing light emitting device 10a to function as a slave device that transmits, via light communication, the external ID input from an external source can be performed with a simple operation.

Note that the ID may be, for example, identification information as defined by Japan. Electronics and Information Technology Industries Association (JEITA) standard CP-1223. The ID typically includes a preamble indicating the head of the ID, length information, a payload, and error correction (or detection) code. Note that length information indicates payload length, but the payload included in the ID is not required to be of a fixed length. Moreover, even if the payload included in the ID is variable length data, the payload length can be omitted by including variations of the preamble instead. Error correction (or detection) code is, for example, cyclic redundancy code (CRC).

Figure 2:
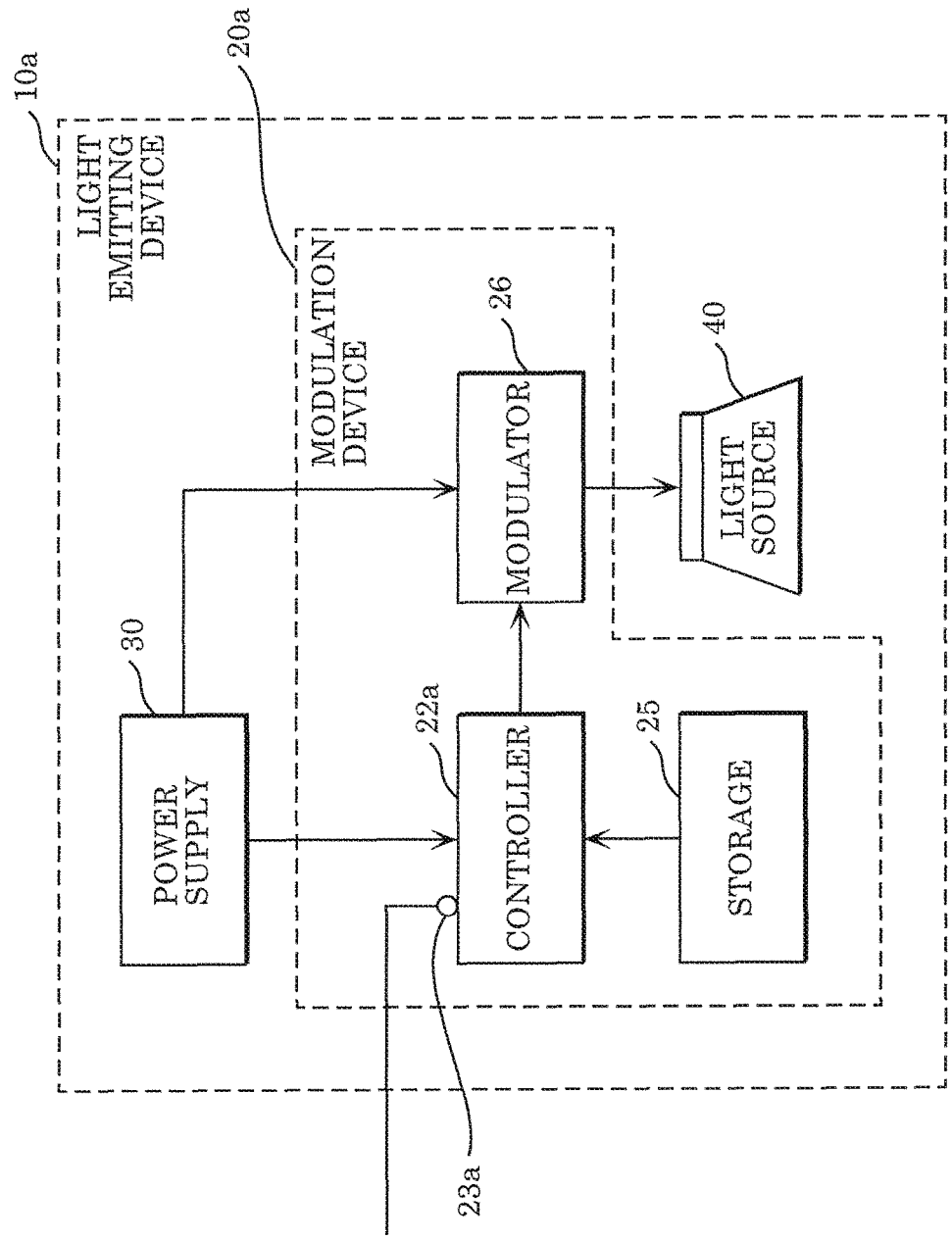
FIG. 2 is a block diagram of a light emitting device according to Embodiment 1.

FIG. 2 is a block diagram of light emitting device 10a illustrated in FIG. 1. Light emitting device 10a includes power supply 30, light source 40, and modulation device 20a.

Power supply 30 is a circuit that supplies power to modulation device 20a, and, for example, includes an AC/DC converter which converts industrial alternating current into direct current and supplies the converted current to modulation device 20a, and a DC/DC converter. Note that in FIG. 2, power supplied to light source 40 reaches light source 40 from power supply 30 via modulation device 20a, but power may be supplied to light source 40 directly from power supply 30.

Light source 40 is a light emitting device that emits light as a result of receiving a current supply, and is, for example, an LED, organic EL device, or laser. Note that light source 40 may be a light, source that emits light of a wavelength other than visible light, such as infrared light.

Modulation device 20a is a device that receives power from power supply 30 to operate and causes light source 40 to perform light communication. Modulation device 20a includes control circuit 22a, storage 25, and modulator circuit 26.

Modulator circuit 26 is a drive circuit that modulates the magnitude of the current supplied to light source 40 to cause light source 40 to perform light communication, and controls the magnitude of current applied to light source 40 in accordance with a signal input from control circuit 22a.

Storage 25 is a circuit that stores, for example, an internal ID, which is predetermined self-identification information. Storage 25 is, for example, a non-volatile memory.

Control circuit 22a outputs, to modulator circuit 26, either the external ID, which is identification information supplied from an external source, or the internal ID, depending on whether the external ID is input into light emitting device 10a or not. In this way, control circuit 22a controls transmission via light communication by selectively switching between the external ID and the internal ID and causing the selected ID to be transmitted. Control circuit 22a is an electronic circuit and includes, for example, a non-volatile memory storing a control program, a processor that executes the control program, a volatile memory, and an input/output port. When control circuit 22a outputs the external ID or internal ID to modulator circuit 26 and the external ID or internal ID is a baseband signal not modulated with 4 pulse position modulation (4-PPM), the signal is modulated using 4 pulse position modulation (4-PPM) and output to modulator circuit 26. Signals modulated using 4-PPM have a digital waveform characterized by, for example, a 3.3 volt 1-bit and a 0 volt 0-bit, and a duration thereof that is 104 μs (9.6 KHz).

Control circuit 22a more specifically includes input port 23a that receives an input of the external ID via signal line 13a, and monitors whether the external ID is input into input port 23a to determine whether the external ID is input into modulation device 20a. Control circuit 22a then switches between signals to be input into modulator circuit 26 in accordance with the result of the determination. Stated differently, when control circuit 22a determines that the external ID is input, control circuit 22a causes the input external ID to be input into modulator circuit 26, and when control circuit 22a determines that the external ID is not input, control circuit 22a causes the internal ID stored in storage 25 to be input into modulator circuit 26. More specifically, in Embodiment 1, when control, circuit 22a determines that the external ID is input into input port 23a, control circuit 22a outputs the input external ID to modulator circuit 26. However, when control circuit 22a determines that the external ID is not input, into input port 23a, control circuit 22a reads the internal ID from storage 25 and outputs the internal ID to modulator circuit 26.

Note that in Embodiment 1, when the external ID is input into input port 23a of control circuit 22a, a first interruption occurs in control circuit 22a, whereby control circuit 22a suspends its main process and executes the first interruption process.

Next, operations performed by light emitting device 10a described above according to Embodiment 1 will be described.

Figure 3:
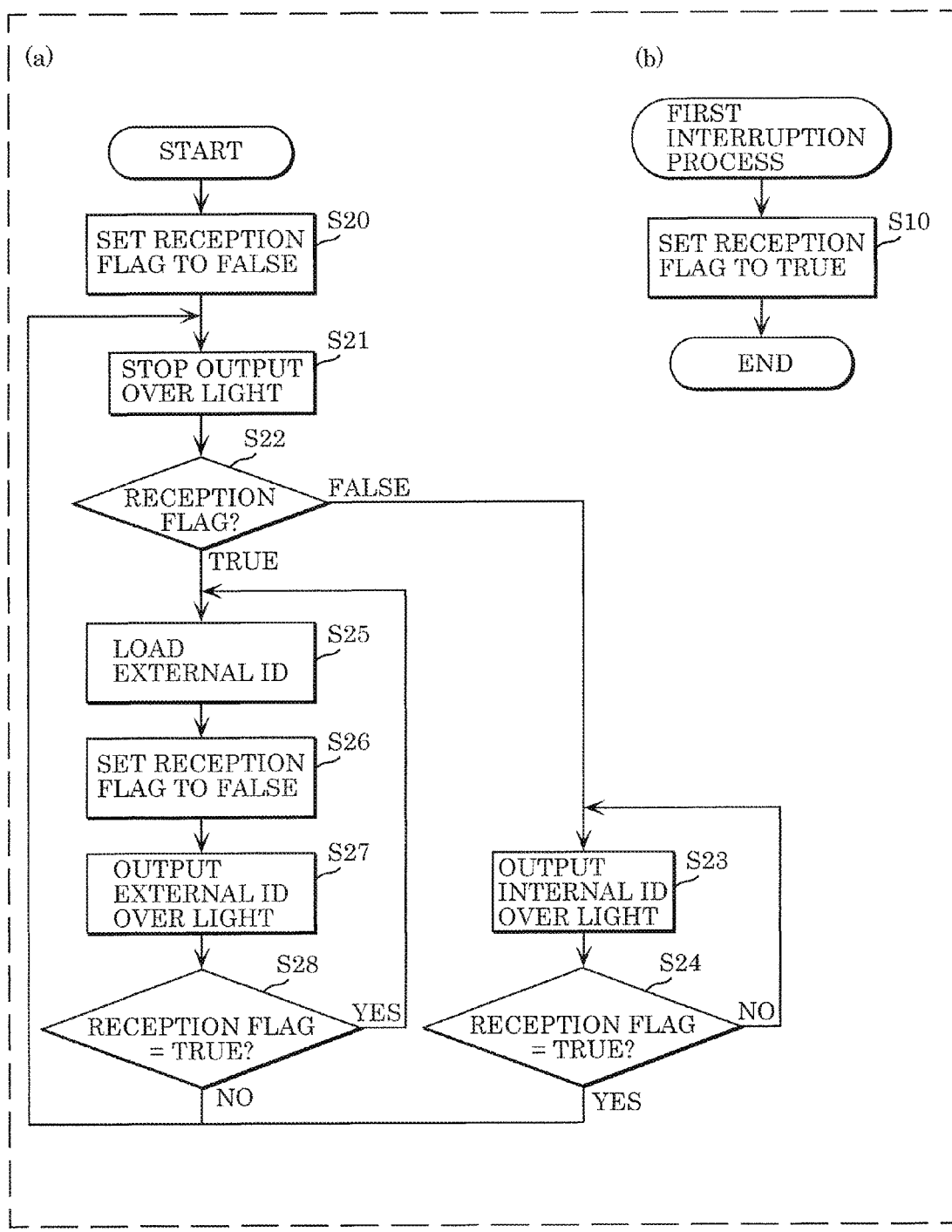
FIG. 3 is a flow chart illustrating operations performed by a light emitting device according to Embodiment 1.

FIG. 3 is a flow chart illustrating operations performed by light emitting device 10a according to Embodiment 1. In FIG. 3, flow of the main process ((a) in FIG. 3) performed by control circuit 22a and flow of the first interruption process ((b) in FIG. 3) performed by control circuit 22a are illustrated.

As illustrated in (b) in FIG. 3, when the external ID is input into input port 23a of control circuit 22a, as the first interruption process, control circuit 22a sets a reception flag, which indicates whether or not the external ID is input, to TRUE (for example, "1"), indicating input of the external ID (S10). Note that the reception flag is information stored temporarily in control circuit 22a, such as in the internal volatile memory.

As illustrated in (a) in FIG. 3, control circuit 22a executes the following processes (S20 through S28) as the main process. First, as the initialization process, control circuit 22a sets the reception flag to FALSE (for example, "0") (S20), and stops light communication by stopping the output of signals to modulator circuit 26 (i.e., stops output over light) (S21).

Control circuit 22a then determines the value of the reception flag (TRUE or FALSE) (S22). When the reception flag indicates FALSE (FALSE in S22), control circuit 22a determines that the first interruption has not occurred—i.e., determines that the external ID is not input into input port 23a of control circuit 22a—and performs the following processes (S23 through S24). First, control circuit 22a transmits the internal ID via light communication (i.e., outputs the internal ID over light) by reading the internal ID from storage 25 and outputting the internal ID to modulator circuit 26 (S23). Then, control circuit 22a determines the value of the reception flag (TRUE or FALSE) (S24), and until the reception flag indicates TRUE (i.e., until the external ID is input into input port 23a), repeatedly outputs the internal ID to modulator circuit 26 (FALSE in S24).

When the reception flag changes to TRUE (TRUE in S24), control circuit 22a returns to step S21, stops light communication by stopping the output of signals to modulator circuit 26 (S21), and then determines the value of the reception flag (TRUE or FALSE) (S22).

Here, since the reception flag is determined to have changed to TRUE (TRUE in S22), control circuit 22a determines that the first interruption has occurred—i.e., determines that the external ID is input into input port 23a of control circuit 22a—and performs the following processes (S25 through S28). First, control circuit 22a loads, into the internal volatile memory, the external ID input into input port 23a of control circuit 22a (S25), sets the reception flag to FALSE (S26), and outputs the loaded external ID to modulator circuit 26 (S27). As a result, the external ID is transmitted via light communication (i.e., output over light).

Control circuit 22a then determines the value of the reception flag (TRUE or FALSE) (S28), and until the reception flag indicates FALSE, outputs the repeatedly input external ID to modulator circuit 26 (TRUE in S28). With this, so long as input of the external ID is repeated input, the input external ID is loaded by control circuit 22a, output to modulator circuit 26, and then transmitted via light communication.

When the reception flag changes to FALSE (FALSE in S28), control circuit 22a returns to step S21, stops light communication by stopping the output of signals to modulator circuit 26 (S21), and then determines the value of the reception flag (TRUE or FALSE) (S22).

Here, since the reception flag is determined to have changed to FALSE (FALSE in S22), control circuit 22a determines that the first interruption has not occurred—i.e., determines that the external ID is not input into input port 23a of control circuit 22a—and transmits the internal ID (S23 through S24).

As described above, modulation device 20a included in light emitting device 10a according to Embodiment 1 includes modulator circuit 26 that causes light source 40 to perform light communication, storage 25 that stores an internal ID, and control circuit 22a. Control circuit 22a determines whether an external ID is input into modulation device 20a. When control circuit 22a determines that the external ID is input into modulation device 20a, control circuit 22a causes the input external ID to be input into modulator circuit 26. When control circuit 22a determines that the external ID is not input into modulation device 20a, control circuit 22a causes the internal ID stored in storage 25 to be input into modulator circuit 26. In this way, control circuit 22a selects which signal is to be input into modulator circuit 26.

With this, when the external ID is input from an external source, light communication is performed in accordance with the external ID, and when the external ID is not input from an external source, light communication is performed in accordance with the internal ID stored internally. Thus, light emitting device 10a is not; only capable of being used as an element in a light emission system including a plurality of light emitting devices that transmit the same ID in synchronization via light communication, but is also capable of being used as a standalone device that transmits an ID on its own via light communication, which makes light emitting device 10a more convenient.

Note that in FIG. 3, the process flow is illustrated on the premise that the first interruption process is always permitted, but control circuit 22a may control the permission and prohibition of the first interruption process. Stated differently, in the main process, control circuit 22a permits the first interruption process upon permitting the first interruption, and prohibits the first interruption upon completion of all first interruption processes in the first interruption process. With this, the timing of the input of the external ID into input port 23a of control circuit 22a (the period in which first interruption is permissible) can be set to a desired period.

Embodiment 2

Next, the light emitting device according to Embodiment 2 of the present disclosure will be described.

Figure 4:
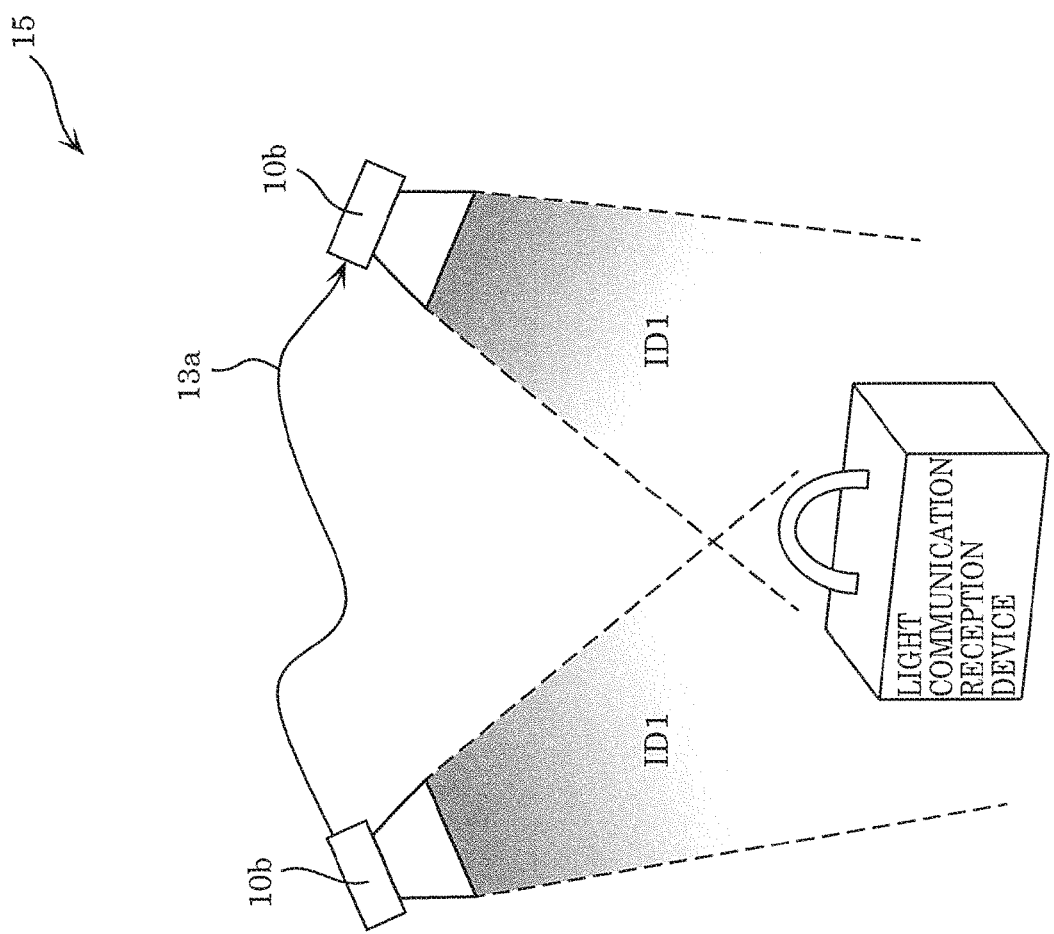
FIG. 4 illustrates a usage example of a light emitting device according to Embodiment 2.

FIG. 4 illustrates a usage example of light emitting device 10b according to Embodiment 2. Here, light emission system 15 including light emitting device 10b configured of two lighting devices connected together by signal line 13a is illustrated. Signal line 13a is a cable for inputting the internal ID output from a first light emitting device 10b functioning as the master device, into a second light emitting device 10b functioning as a slave device, as an external ID. Stated differently, via signal line 13a, the internal ID stored in storage included in the first light emitting device 10b is input into the modulator circuit of the first light emitting device 10b, and that internal ID is input into the second light emitting device 10b as an external ID.

With light emission system 15 configured as described above, the same ID ("ID1" in FIG. 4) is transmitted in synchronization via light communication from two light emitting devices 10b. Thus, as illustrated in FIG. 4, even in a region in which light from two light emitting devices 101) overlaps, the light communication reception device that receives the light can receive the ID without failure.

Moreover, since configuring light emission system 15 in this manner makes it possible to achieve synchronized transmission simply by connecting two light emitting devices 10b via signal line 13a, the visible light communication signal output device required by the conventional light emission system according to Japanese Unexamined Patent Application Publication No. 2013-110599 is not required, thereby simplifying the system structure.

Note that even when the light emission system includes three or more light emitting devices 10b, by connecting the three or more light emitting devices 10b in series (or in a daisy chain configuration) with signal line 13a, a large-scale light emission system can be easily achieved. Even with such a large-scale light emission system, the light emission system can be easily achieved simply by connecting two adjacent light emitting devices together in series with a signal line. Thus, a long signal line to connect the visible light communication signal output device required by the light emission system according to Japanese Unexamined Patent Application Publication No, 2013-110599 and the plurality of light emitting devices is not required.

Figure 5A:
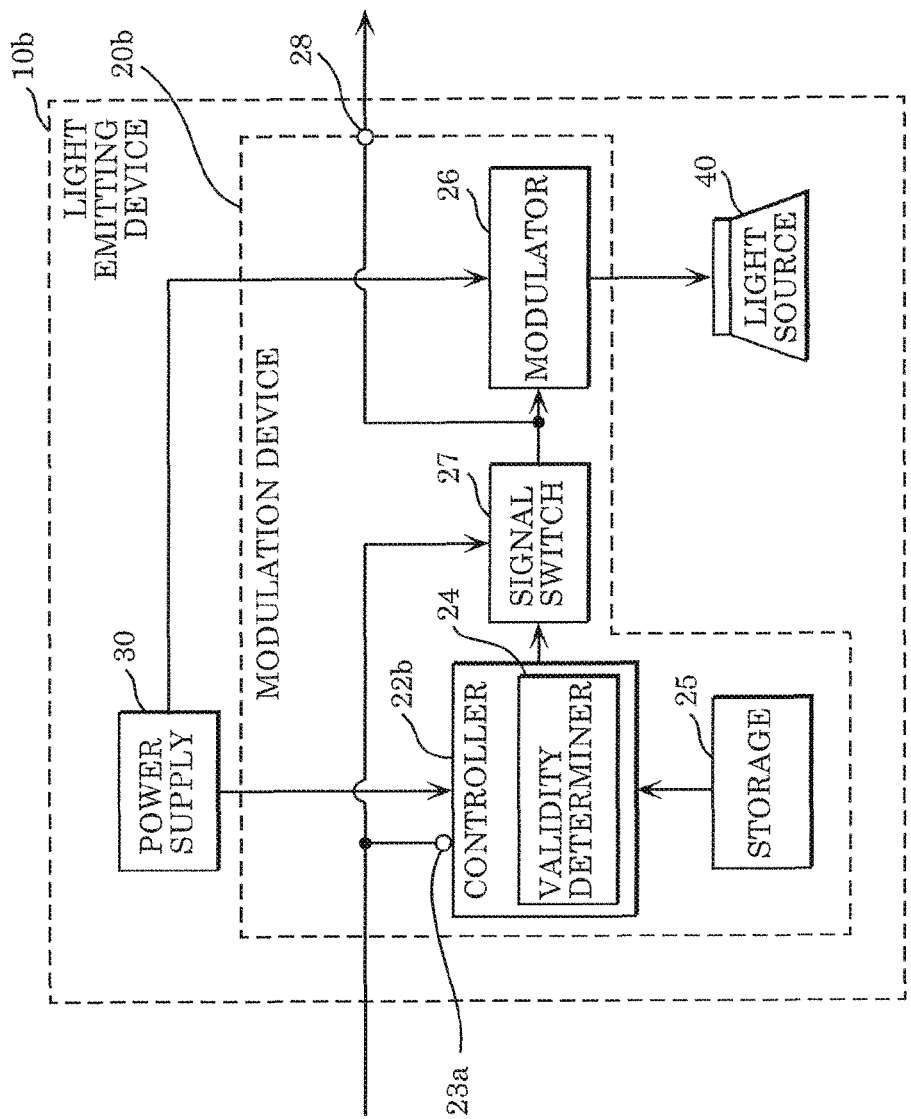
FIG. 5A is a block diagram of a light emitting device according to Embodiment 2.
Figure 5B:
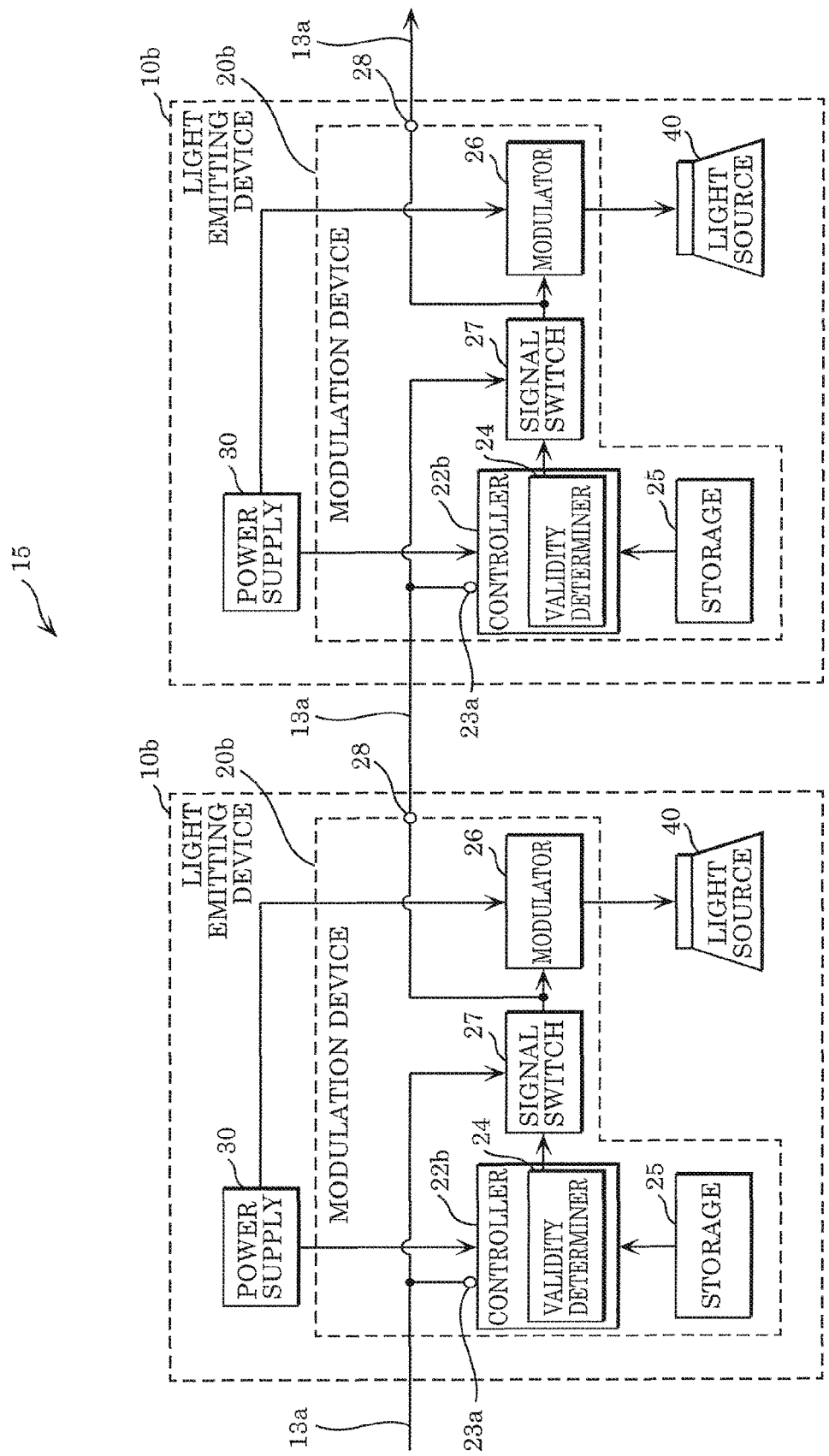
FIG. 5B is a block diagram of a light emission system according to Embodiment 2.

FIG. 5A is a block diagram of the single light emitting device 10b illustrated in FIG. 4, and FIG. 5B is a block diagram of light emission system 15 including a plurality of light emitting devices 10b illustrated in FIG. 5A, connected together by signal line 13a.

As illustrated in FIG. 5A, light emitting device 10b according to Embodiment 2 includes power supply 30, light source 40, and modulation device 20b. Modulation device 20b includes control circuit 22b, storage 25, modulator circuit 26, signal switch 27, and ID transmission terminal 28. Light emitting device 10b and modulation device 20b according to Embodiment 2 have similar configurations as in Embodiment 1. However, in Embodiment 2, modulation device 20b and control circuit 22b differ from Embodiment 1 in that modulation device 20b includes signal switch 27 and ID transmission terminal 28, and control circuit 22b includes validity determiner 24. Hereinafter, those elements that are the same or similar as in Embodiment 1 have the same reference numerals, and description thereof is omitted. The following description will focus on the points of difference with Embodiment 1.

Note that with light emission system 15 illustrated in FIG. 5B, two adjacent light emitting devices 10b among the plurality of light emitting devices included in light emission system 15 are connected together by signal line 13a. Stated differently, signal line 13a is connected such that the ID (the external ID or internal ID) output from signal switch 27 of light emitting device 10b located farthest upstream via ID transmission terminal 28 is input into input port 23a and signal switch 27 of light emitting device 10b located downstream.

Signal switch 27 is a two input, one output switch that selects one of the external ID inserted into modulation device 20b and the internal ID stored in storage 25, and outputs the selected ID to modulator circuit 26. When control circuit 22b determines that the external ID is input into modulation device 20b (in this case input port 23a of control circuit 22b), control circuit 22b controls signal switch 27 in such a manner as to cause signal switch 27 to select the external ID and output the external ID to modulator circuit 26. When control circuit 22h determines that the external ID is not input into modulation device 20b (in this case input port 23a of control circuit 22b), control circuit 22b controls signal switch 27 in such a manner as to cause signal switch 27 to select the internal ID and output the internal ID to modulator circuit 26.

Figure 6:
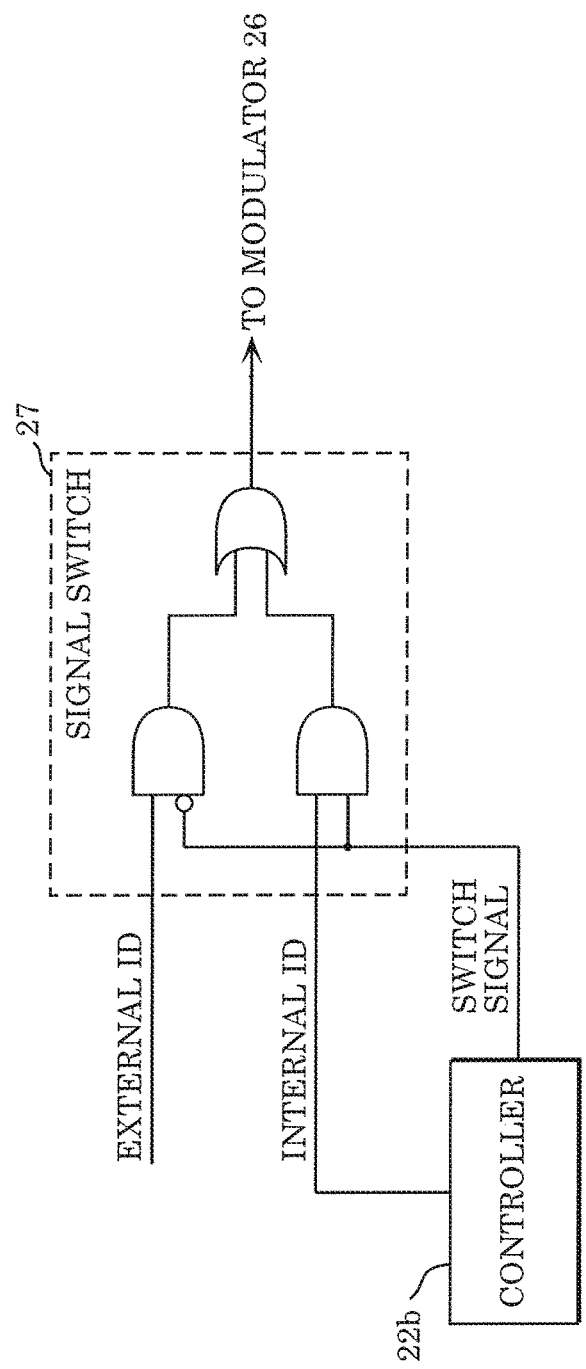
FIG. 6 illustrates the configuration of a signal switch included in a light emitting device according to Embodiment 2 in detail.

Signal switch 27 having the function described above can be achieved using, for example, a logic circuit including three gates, as illustrated in FIG. 6. With signal switch 27 illustrated in FIG. 6, when the switch signal output from control circuit 22b is "low", the external ID is output from signal switch 27, and when the switch signal is "high", the internal ID is output from signal switch 27.

ID transmission terminal 28 is a terminal that outputs, to an external destination, the signal input into modulator circuit 26, and in order to achieve light emission system 15 in which the same ID is transmitted via light communication in synchronization with other light emitting devices, is used for connecting with the input port of the control circuit of another light emitting device via signal line 13a.

In addition to the functions of control circuit 22a according to Embodiment 1, control circuit 22b includes, as a functional element, validity determiner 24. Validity determiner 24 determines whether the external ID input into modulation device 20b (more specifically, input port 23a of control circuit 22b) is a predetermined valid signal or not. When control circuit 22b determines that the external ID is input into input port 23a of control circuit 22b, control circuit 22b causes the input external ID to be input into modulator circuit 26—i.e., outputs the input external ID to modulator circuit 26—only when validity determiner 24 determines the input external ID to be valid.

More specifically, validity determiner 24 determines the external ID to be a predetermined valid signal when one or a combination of the following conditions (1) through (4) is met.

(1) The external ID is a bit sequence that has been modulated in accordance with predetermined modulation. For example, the external ID is a bit sequence that has been modulated using 4-PPM (for example, in the bit sequence of the external ID, on average, three out of four bits are "0").

Figure 7:
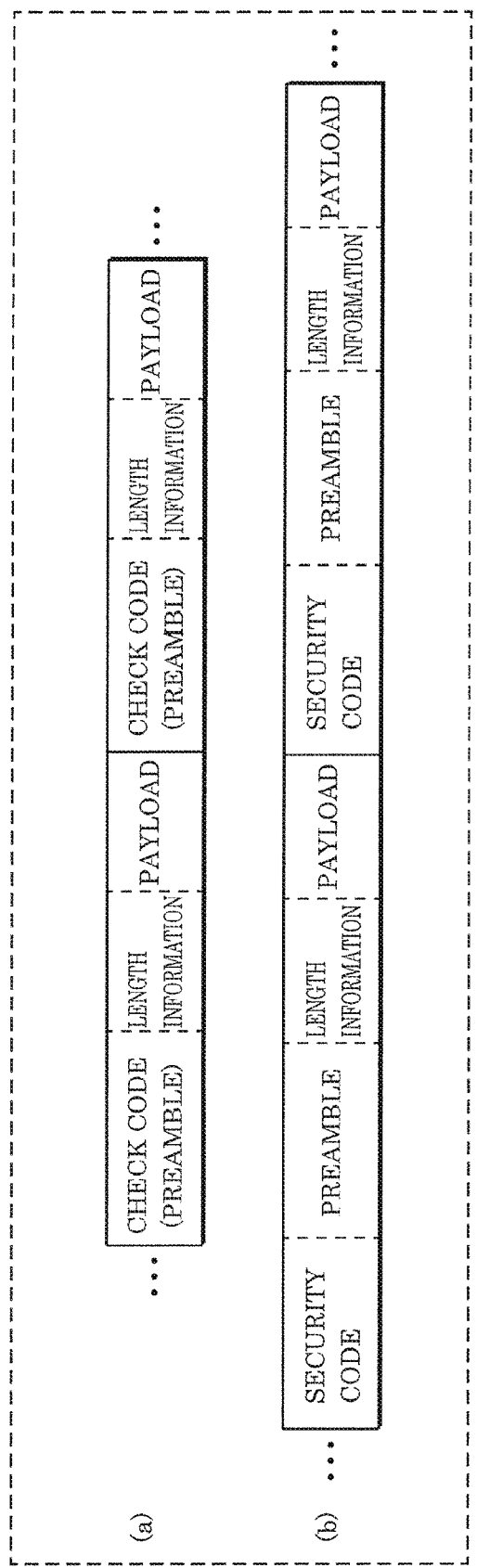
FIG. 7 illustrates an example of the format of an ID.

(2) The external ID includes a preamble as check code, such as in the ID format example illustrated in (a) in FIG. 7. For example, when the ID is code conforms to the CP-1223 standard, the condition is that the preamble is "111000000000".

(3) A rule regarding bit format stipulated by a standard is satisfied. For example, in order to determine the validity, when the length of the loaded external ID is twice the maximum ID length stipulated by the CP-1223 standard, as is the case in (a) in FIG. 7, the condition is that the number of bits from one preamble to the next preamble is a predetermined number of bits. Alternatively, the code may be checked using CRC to confirm that the included data is correct. Alternatively, in order to determine the validity, when the length of the loaded external ID is three times the maximum ID length stipulated by the CP-1223 standard, the condition is that at least two preambles are detected.

(4) The external ID includes security code of a predetermined bit pattern, such as in the ID format example illustrated in (b) in FIG. 7.

Next, operations performed by light emitting device 10b described above according to Embodiment 2 will be described.

Figure 8:
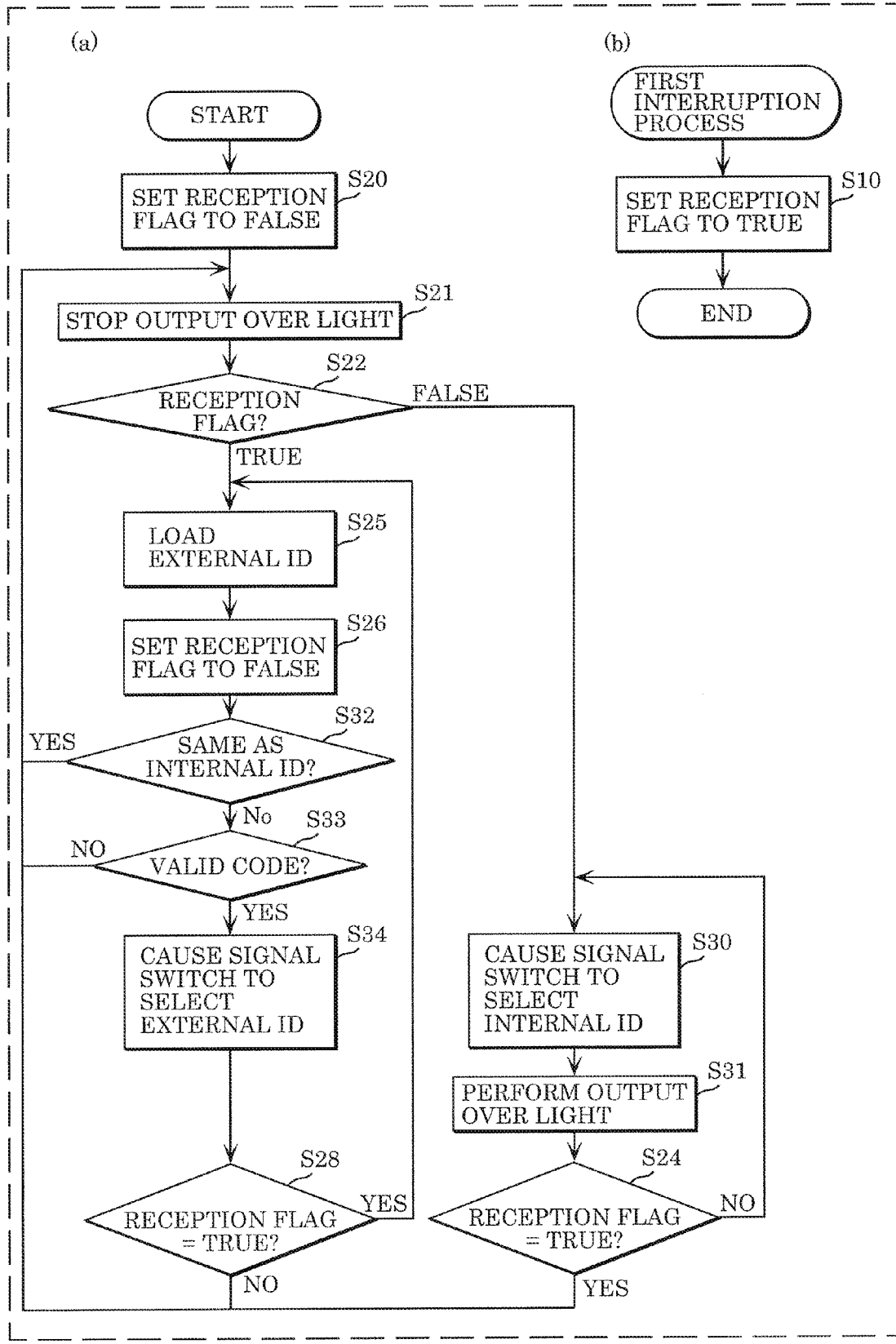
FIG. 8 is a flow chart illustrating operations performed by a light emitting device according to Embodiment 2.

FIG. 8 is a flow chart illustrating operations performed by light emitting device 10b according to Embodiment 2. In FIG. 8, flow of the main process ((a) in FIG. 8) performed by control circuit 22b and flow of the first interruption process ((b) in FIG. 8) performed by control circuit 22b are illustrated. In the main process according to Embodiment 2, step S23 according to Embodiment 1 is replaced by steps S30 and S31; steps S32 and S33 are added to Embodiment 1; and step S27 in Embodiment 1 is replaced by steps S34 and S35. Hereinafter, those elements that are the same or similar as in Embodiment 1 have the same reference numerals, and description thereof is omitted. The following description will focus on the points of difference with Embodiment 1.

In step S22 of the main process shown in (a) in FIG. 8, when control circuit 22b determines that the reception flag is FALSE (FALSE in S22), control circuit 22b determines that the external ID is not input into input port 23a of control circuit 22b, and performs the following processes. First, control circuit 22b controls signal switch 27 in such a manner as to cause signal switch 27 to select which signal is input from control circuit 22b, and reads the internal ID from storage 25 and outputs the internal ID to signal switch 27 (S30). As a result, the internal ID output from control circuit 22b is output to modulator circuit 26 and ID transmission terminal 28 via signal switch 27 and transmitted via light communication, and the internal ID is transmitted to an external destination from ID transmission terminal 28 (S31). With this, light emitting device 10b operates as a master device that transmits the internal ID via light communication (i.e., outputs the internal ID over light), and outputs the internal ID to another light emitting device (i.e., outputs the internal ID to an external destination).

Figure 9A:
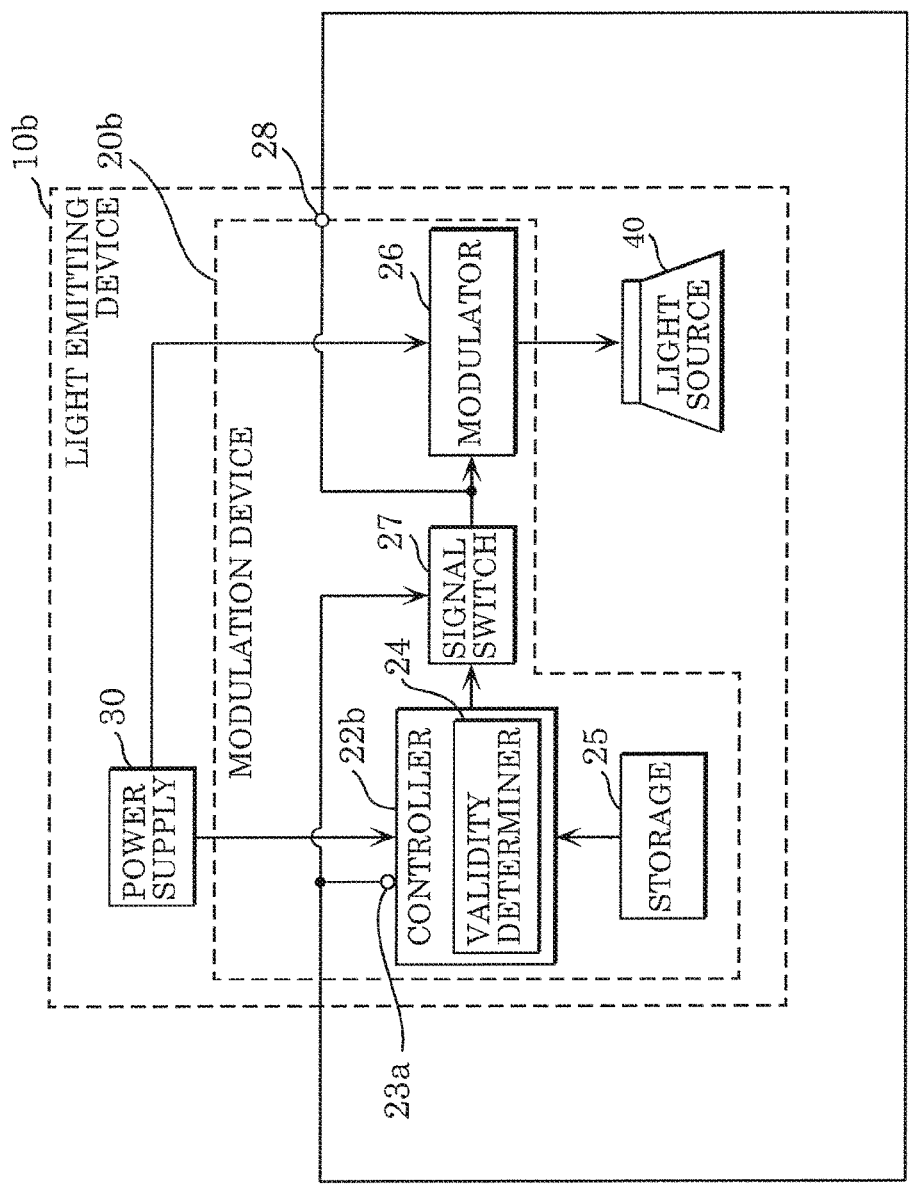
FIG. 9A is a block diagram of a loop connection in a single light emitting device according to Embodiment 2.
Figure 9B:
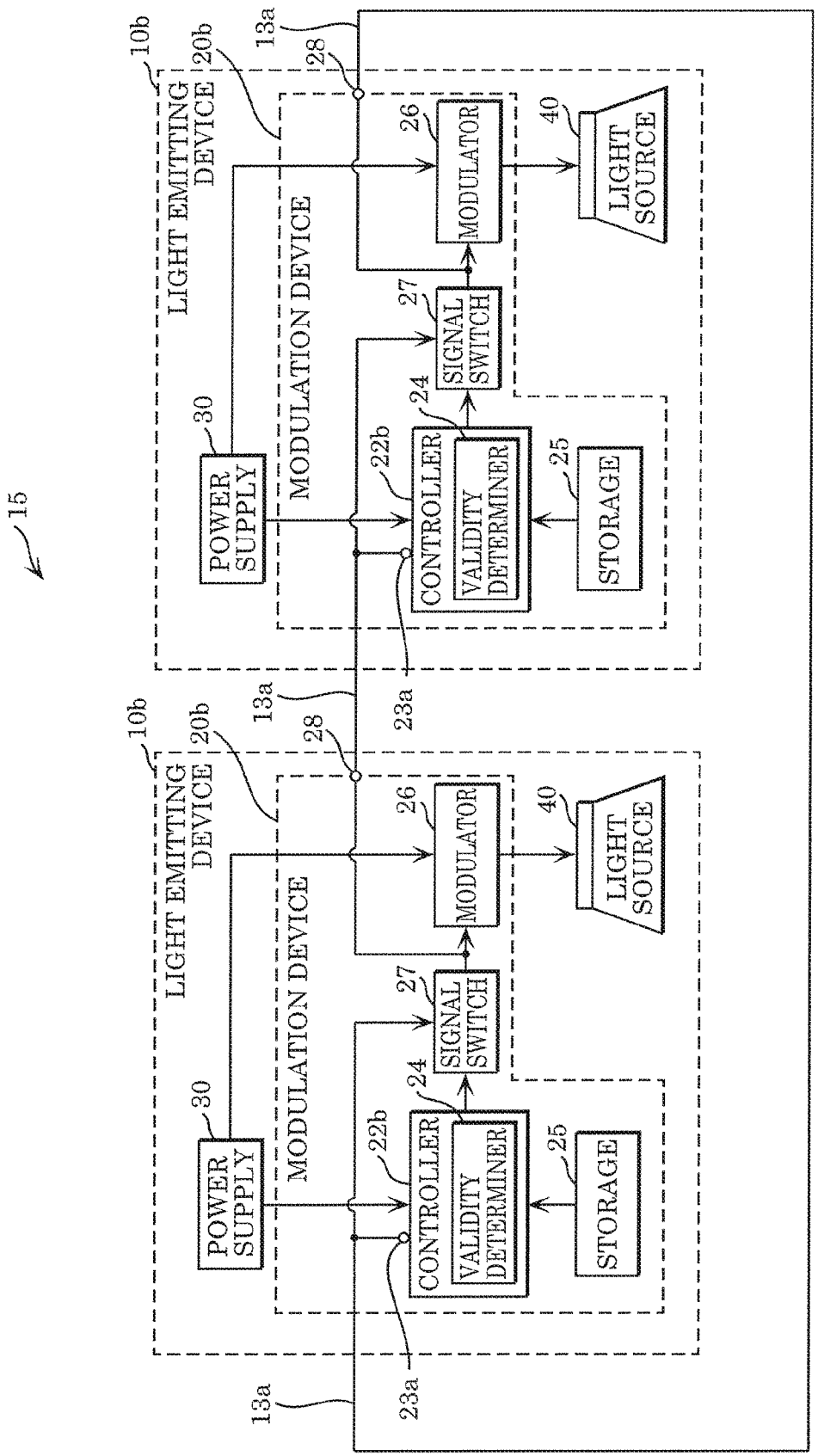
FIG. 9B is a block diagram of a loop connection in a light emission system according to Embodiment 2.

Moreover, in step S26 of the main process shown in (a) of FIG. 8, control circuit 22b loads, into the internal volatile memory, the external ID input into input port 23a of control circuit 22b (S26), and then performs the following processes. Control circuit 22b determines whether the loaded external ID is the same as the internal ID stored in storage 25 or not (S32). When the result is that the external ID is the same as the internal 1D (Yes in S32), control circuit 22b causes a signal for maintaining the current supplied to light source 40 at a constant magnitude to be input into modulator circuit 26 instead of the external ID (S21). In Embodiment 2, control circuit 22b stops the output of signals to modulator circuit 26. With this, when the external ID input from an external source is the same as the internal ID, light communication is stopped. This is in order to inhibit unstable operation of light emitting device 10b in the case that light emitting device 10b is erroneously connected in a loop and the internal ID transmitted by light emitting device 10b returns to the same light emitting device 10b. Note that "connected in a loop" refers to the connection configuration illustrated in FIG. 9A and FIG. 9B. In FIG. 9A, in a single light emitting device 10b, ID transmission terminal 28 and the input port of control circuit. 22b are connected via signal line 13a. In FIG. 9B, in light emission system 15 including a plurality of light emitting devices 10b connected in series, (i) ID transmission terminal 28 of light emitting device 10b located farthest downstream and (ii) the input port of control circuit 22b of light emitting device 10b located farthest upstream are connected via signal line 13a.

However, when the loaded external ID is determined not to be the same as the internal ID stored in storage 25 (No in S32), validity determiner 24 of control circuit 22b determines whether the external ID input into input port 23a of control circuit 22b is a valid signal or not (S33). When validity determiner 24 determines the input external ID to be valid (Yes in S33), control circuit 22b causes the input external ID to be input into modulator circuit 26 (S34). Stated differently, control circuit 22b controls signal switch 27 in such a manner as to cause signal switch 27 to select the external ID and input the external ID into modulator circuit 26 (S34). As a result, the external ID input from an external source is output to modulator circuit 26 and ID transmission terminal 28 via signal switch 27, transmitted via light communication, and transmitted from ID transmission terminal 28. With this, light emitting device 10b operates as a slave device that transmits, via light communication, the external ID received from another light emitting device.

As described above, modulation device 20b included in light emitting device 10b according to Embodiment 2 includes ID transmission terminal 28 that outputs, to an external destination, a signal input into modulator circuit 26. With this, light emission system 15 in which the same IDs are transmitted in synchronization via light communication is easily achieved by connected in series a plurality of light emitting devices 10b via signal line 13a. Stated differently, the visible light communication signal output device required by the conventional light emission system according to Japanese Unexamined Patent Application Publication No. 2013-110599 is not required, thereby simplifying the system structure. Moreover, even when configuring a large scale light emission system 15 including multiple light emitting devices 10b, this can be achieved simply by connecting two adjacent light emitting devices in series via signal line 13a. Thus, a long signal line to connect the visible light communication signal output device required by the light emission system according to Japanese Unexamined Patent Application Publication No. 2013-110599 and the plurality of light emitting devices is not required.

Moreover, modulation device 20b included in light emitting device 10b according to Embodiment 2 includes signal switch 27 that selects one of the external ID input into modulation device 20b and the internal ID stored in storage 25, and outputs the selected ID to modulator circuit 26. When control circuit 22b determines that the external ID is input into modulation device 20b, control circuit 22b controls signal switch 27 in such a manner as to cause signal switch 27 to select the external ID and output the external ID to modulator circuit 26, and when control circuit 22b determines that the external ID is not input into modulation device 20b, control circuit 22b controls signal switch 27 in such a manner as to cause signal switch 27 to select the internal ID and output the internal ID to modulator circuit 26. With this, signal switch 27 switches between IDs to be input into modulator circuit 26, that is to say, assured signal switching is performed by hardware.

Moreover, in Embodiment 2, control circuit 22b of modulation device 20b includes validity determiner 24 that determines whether the external ID input into modulation device 20b is a predetermined valid signal or not. When control circuit 22b determines that the external ID is input into modulation device 20b, control circuit 22b causes the external ID to be input into modulator circuit 26 only when validity determiner 24 determines the external ID to be valid. With this, since the external ID is input into modulator circuit 26 only when the validity of the external ID is confirmed, invalid external IDs can be inhibited from being input into light emitting device 10b and transmitted via light communication. Stated differently, inhibition of operation services of transmitting legitimate IDs via light communication can be reduced.

Moreover, when the external ID includes a security code, which is a predetermined bit pattern, validity determiner 24 can determine the external ID to be a valid signal. Since this allows the validity of the external ID to be confirmed with a security code added to the external ID, setting a desired security code and changing the security code is easily accomplished.

Moreover, when control circuit 22b of modulation device 20b according to Embodiment 2 determines that the external ID is input into modulation device 20b, control circuit 22b determines whether the input external ID is the same as the internal ID or not. If controller circuit 22b determines that the input external ID is the same, control circuit 22b causes a signal for maintaining the current supplied to the light source at a constant magnitude to be input into modulator circuit 26 instead of the external ID. With this, when the external ID input from an external source is the same as the internal ID, the light communication is stopped. This inhibits unstable operation of light emitting device 10b in the case that light emitting device 10b is erroneously connected in a loop and the internal ID transmitted by light emitting device 10b returns to the same light emitting device 10b. Moreover, light communication can easily be stopped when stopping light communication is desired by using a loop connection to reduce unnecessary light communication by light emitting device 10b. Note that in this case, a predetermined amount of light (including no light) may be emitted at the same time as the light communication is stopped. By not emitting light, use of a loop connection can be detected. By using a loop connection, communication can be stopped in an intended manner and interruption of light communication of nearby light emitting devices can be inhibited.

Embodiment 3

Next, operations performed by the light emitting device according to Embodiment 3 of the present disclosure will be described.

Figure 10A:
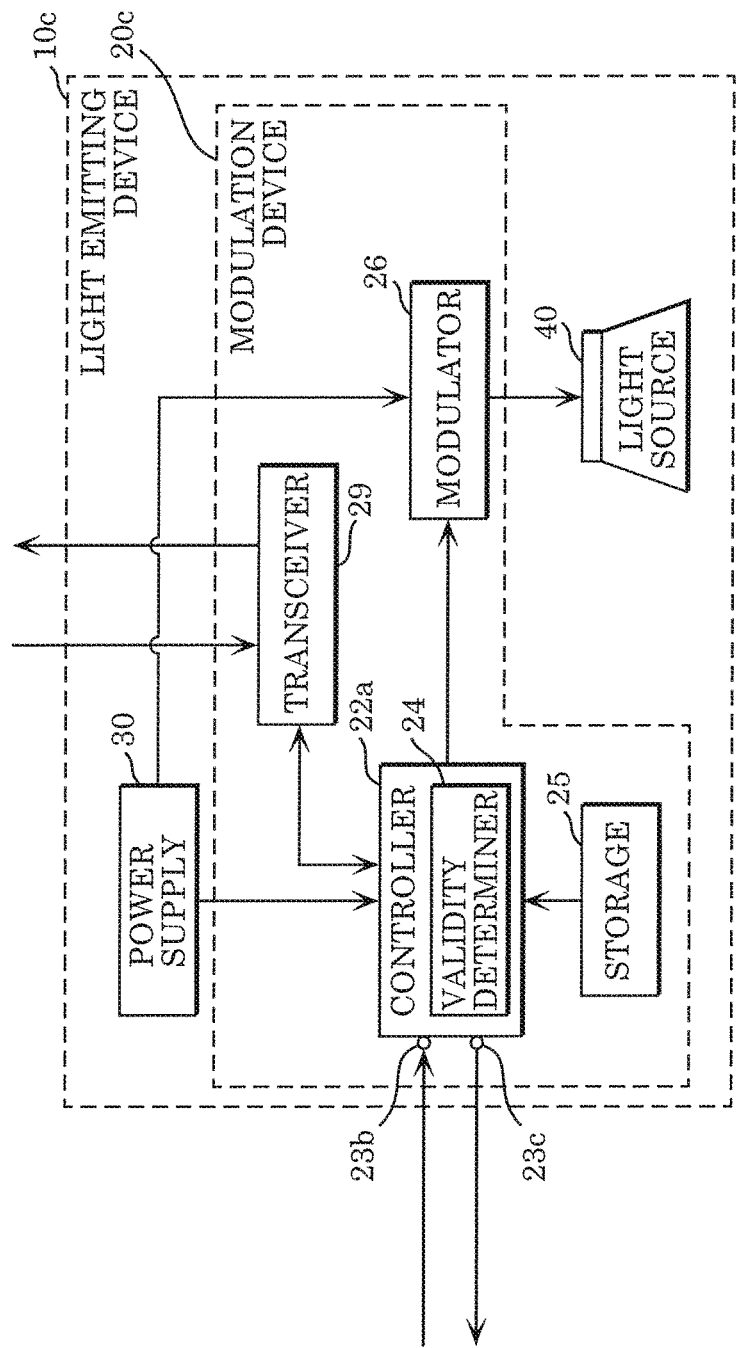
FIG. 10A is a block diagram of a light emitting device according to Embodiment 3.
Figure 10B:
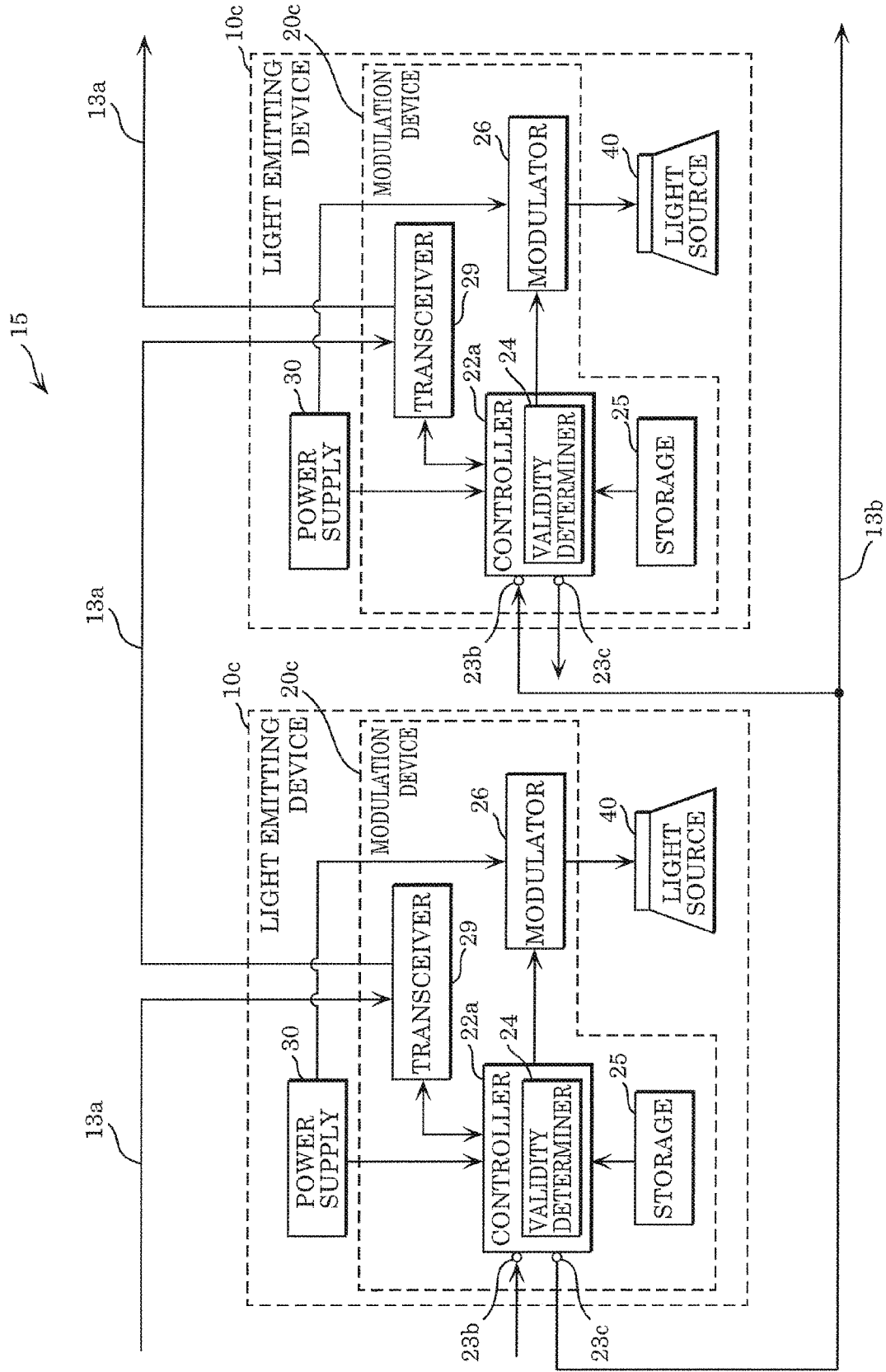
FIG. 10B is a block diagram of a light emission system according to Embodiment 3.

FIG. 10A is a block diagram of light emitting device 10c according to Embodiment 3, and FIG. 10B is a block diagram of light emission system 15 according to Embodiment 3. More specifically, FIG. 10A is a block diagram of a single light emitting device 10c, and FIG. 10B is a block diagram of light emission system 15 including a plurality of light emitting devices 10c illustrated in FIG. 10A and connected together via signal line 13a.

As illustrated in FIG. 10A, light emitting device 10c according to Embodiment 3 includes power supply 30, light source 40, and modulation device 20c. Modulation device 20c includes control circuit 22c, storage 25, modulator circuit 26, and transceiver 29. Light emitting device 10c and modulation device 20c according to Embodiment 3 have similar configurations as Embodiment 1. However, in Embodiment 3, modulation device 20c differs from Embodiment 1 in that it includes transceiver 29, and control circuit 22c differs from Embodiment 1 in that it includes: synchronization signal input terminal 23b in place of input port 23a; synchronization signal output terminal 23c, and validity determiner 24. Note that similar to Embodiment 2, control circuit 22c includes validity determiner 24. Hereinafter, those elements that are the same or similar as in Embodiments 1 and 2 have the same reference numerals, and description thereof is omitted; the following description will focus on the points of difference with Embodiment 1 and 2.

Note that in light emission system 15 illustrated in FIG. 10B, two adjacent light emitting devices 10c among the plurality of light emitting devices included in light emission system 15 are connected via two types of cables. One is signal line 13a for transmitting an ID (the external ID or the internal ID) to light emitting devices 10c, and connects transceivers 29 of light emitting devices 10c in series. The other is signal line 13b for transmitting a synchronization signal to light emitting devices 10c, and connects synchronization signal output terminal 23c of light emitting device 10c functioning as the master device and synchronization signal input terminal 23b of light emitting device 10c functioning as a slave device in a bus configuration (parallel).

Transceiver 29 is a communications interface that transmits and receives information to and from another modulation device (or light emitting device). For example, transceiver 29 is a communications adapter that transmits and receives encrypted information encrypted with, for example, a cipher. In Embodiment 3, transceiver 29 transmits, to control circuit 22c, the external ID input into modulation device 20c (or light emitting device 10c). Transceiver 29 further outputs, to an external destination (i.e., to another modulation device or light emitting device), the ID (internal ID or external ID) output from control circuit 22c. In Embodiment 3, the ID (internal ID or external ID) transmitted and received via transceiver 29 is, as illustrated in (b) in FIG. 7, an ID added with a security code.

Control circuit 22c includes, in place of input port 23a in Embodiment 1, synchronization signal input terminal 23b for receiving an input, from an external source, of a synchronization signal that indicates timing for causing light source 40 to perform light communication, and synchronization signal output terminal 23c for outputting the synchronization signal to an external destination.

When control circuit 22c receives an external ID via transceiver 29, control circuit 22c performs the following processes. Control circuit 22c causes transceiver 29 to transmit, to an external destination, the external ID received by transceiver 29, and causes the external ID received by transceiver 29 to be input into modulator circuit 26 in synchronization with the synchronization signal input into synchronization signal input terminal 23b. More specifically, when control circuit 22c receives an external ID from transceiver 29, control circuit 22c transmits, via transceiver 29, the received external ID to an external destination. Control circuit 22c further removes the security code from the received external ID and inputs the external ID removed of the security code into modulator circuit 26 in synchronization with the synchronization signal input into synchronization signal input terminal 23b. This is to eliminate the security code as a candidate for reception by light communication. In this way, when an external ID is input into transceiver 29, light emitting device 10c operates as a slave device whereby the external ID is relayed and output to an external destination by transceiver 29, and the external ID is transmitted by light communication after the security code is removed from the external ID.

When control circuit 22c does not receive an external ID via transceiver 29, control circuit 22c performs the following processes. Control circuit 22c causes the internal ID stored in storage 25 to be transmitted to an external destination via transceiver 29 and causes the internal ID stored in storage 25 to be input into modulator circuit 26 in synchronization with outputting of a synchronization signal from synchronization signal output terminal 23c. More specifically, when no external ID is input into transceiver 29 for a predetermined period of time or longer, control circuit 22c adds a security code to the internal ID stored in storage 25 and transmits, via transceiver 29, the internal ID added with the security code to an external destination. Control circuit 22c then outputs the internal ID stored in storage 25 to modulator circuit 26 in synchronization with outputting of the synchronization signal from synchronization signal output terminal 23c. With this, light emitting device 10c operates as a master device whereby the internal ID added with the security code and the synchronization signal are output to an external destination (i.e., to another modulation device or light emitting device), and the internal ID is transmitted via light communication.

Note that in Embodiment 3, when the external ID is input into transceiver 29, the first interruption occurs in control circuit 22c whereby control circuit 22c suspends the main process and executes the first interruption process. When the synchronization signal is input into synchronization signal input terminal 23b, the second interruption occurs in control circuit 22c whereby control circuit 22c suspends the main process and executes the second interruption process.

Next, operations performed by light emitting device 10c according to Embodiment 3 will be described.

Figure 11:
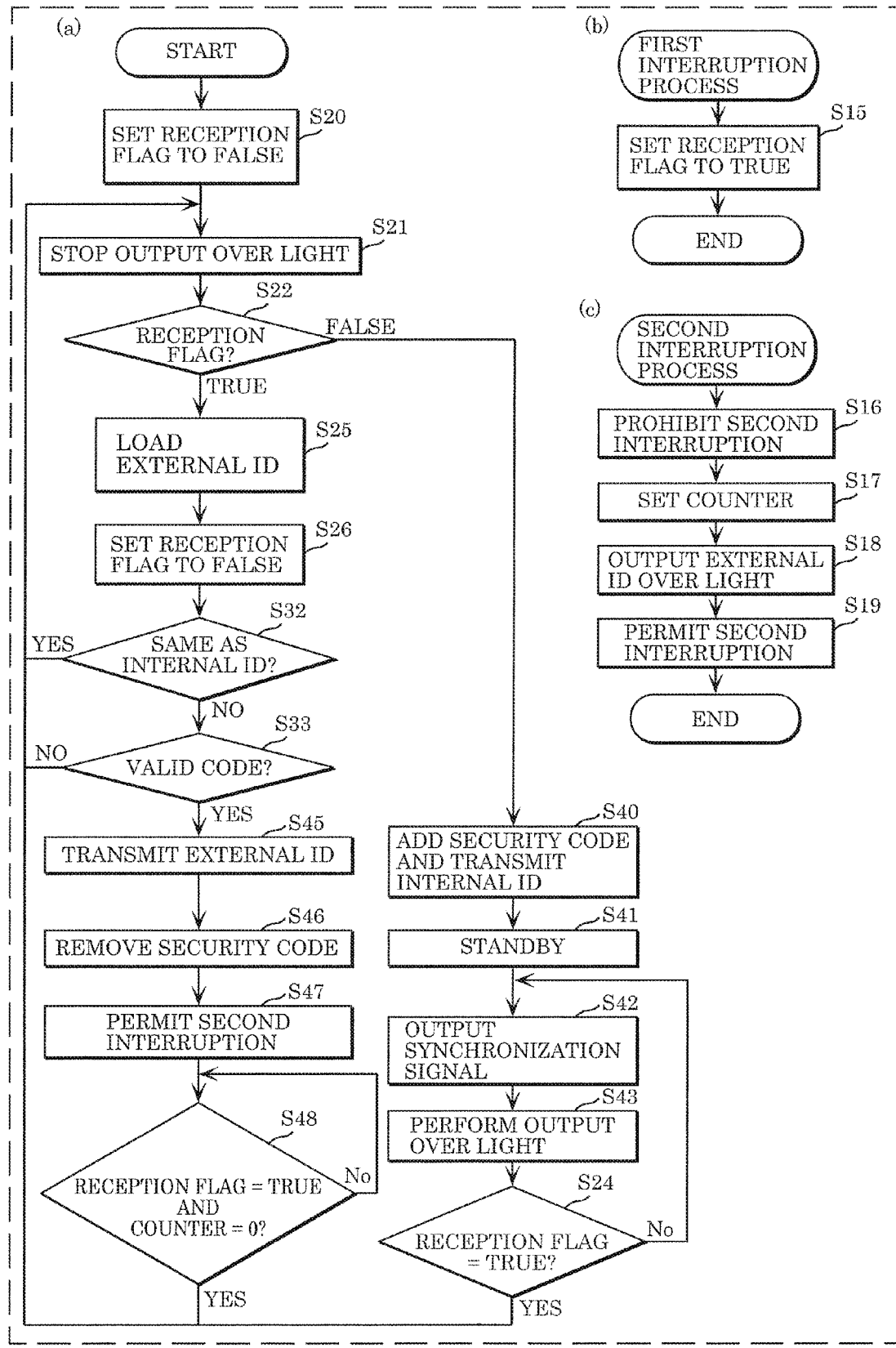
FIG. 11 is a flow chart illustrating operations performed by a light emitting device according to Embodiment 3.

FIG. 11 is a flow chart of operations performed by light emitting device 10c according to Embodiment 3. FIG. 11 illustrates the flow for the main process performed by control circuit 22c ((a) in FIG. 11), the flow for the first interruption process performed by control circuit 22c ((b) in FIG. 11), and the flow for the second interruption process performed by control circuit 22c ((c) in FIG. 11). In the interruption processes according to Embodiment 3, compared to Embodiment 1, the first interruption is performed when the first interruption is triggered by the external ID being input into transceiver 29, and the second interruption process for input of the synchronization signal is added. Furthermore, in the main process according to Embodiment 3, step S23 in Embodiment 1 is replaced with steps S40 through S43, steps S32 and S33 are added to Embodiment 1, and steps S27 through S28 in Embodiment 1 are replaced with steps S45 through S48. Note that the addition of steps S32 and S33 to Embodiment 1 is the same as in Embodiment 2. Hereinafter, those elements that are the same or similar as in Embodiments 1 and 2 have the same reference numerals, and description thereof is omitted; the following description will focus on the points of difference with Embodiment 1 and 2.

As illustrated in (b) in FIG. 11, when the external ID is input into transceiver 29, as the first interruption process, control circuit 22c sets the reception flag indicating whether or not the external. ID is input to indicate TRUE (for example, "1") (S15).

Moreover, as illustrated in (c) in FIG. 11, when the synchronization signal is input into synchronization signal input terminal 23b, as the second interruption process, control circuit 22c enters an operation mode in which the second interruption is prohibited (S16), and sets a counter held internally and starts the countdown of the counter (S1). The timing of the countdown is predetermined based on a timer clock included in control circuit 22c. Control circuit 22c then outputs the external ID (received from transceiver 29 and removed of the security code in advance) to modulator circuit 26 (S18), and enters an operation mode in which second interruption is permitted (S19). With this, the external ID is transmitted via light communication (i.e., output over light).

In step S22 of the main process in (a) in FIG. 11, when control circuit 22c determines that the reception flag is FALSE (FALSE in S22), control circuit 22c determines that the external ID is not input into input port 23a of control circuit 22c, and performs the following processes. Control circuit 22c adds a security code to the internal ID stored in storage 25 and transmits the internal ID added with the security code to an external destination via transceiver 29 (S40). Control circuit 22c then enters standby for a predetermined amount of time (for example, 1 second) (S41), and then in synchronization with outputting of the synchronization signal from synchronization signal output terminal 23c (S42), outputs the internal ID stored in storage 25 to modulator circuit 26 (i.e., outputs the internal ID over light) (S43). With this, light emitting device 10c operates as a master device whereby the internal ID added with the security code and the synchronization signal are output to an external destination (i.e., to another modulation device or light emitting device), and the internal ID is transmitted via light communication (i.e., output over light).

Note that standby for a period of time (S41) ensures that the synchronization signal will be input after the external ID is received in the light emitting device operating as a slave device, thereby ensuring that the received external ID will be transmitted via light communication.

Moreover, in step S33 of the main process in (a) in FIG. 11, control circuit 22c determines the validity of the external ID received via transceiver 29 (S33) and then performs the following processes. Control circuit 22c transmits, via transceiver 29, the external ID received from transceiver 29 to an external destination (S45). Control circuit 22c then removes the security code from the received external ID (S46), and enters an operational mode in which the second interruption is permitted (S47). As a result, when the synchronization signal is input into synchronization signal input terminal 23b, the second interruption process is triggered, and, as the second interruption process, control circuit 22c prohibits the second interruption (S16), and sets a counter held internally and starts the countdown of the counter (S17). Control circuit 22c then outputs the external ID removed of the security code to modulator circuit 26 (S18), and permits the second interruption (S19). As a result, the external ID removed of the security code is transmitted via light communication. In this way, light emitting device 10c operates as a slave device whereby the external ID input into transceiver 29 is relayed and output to an external destination by transceiver 29, and the light communication removed of the security code is transmitted.

Then, the external ID is received from transceiver 29 and, when the reception flag in the first interruption process is TRUE (S15) or the counter set in step S17 goes below 0 (underflow) (S48), control circuit 22c returns to step S21, but otherwise, repeats the determining of step S48. In other words, every time the synchronization signal is input, the second interruption process is called upon, and the external ID is output over light. Here, the counter is set to a value shorter than the time of output of the external ID over light.

Figure 12:
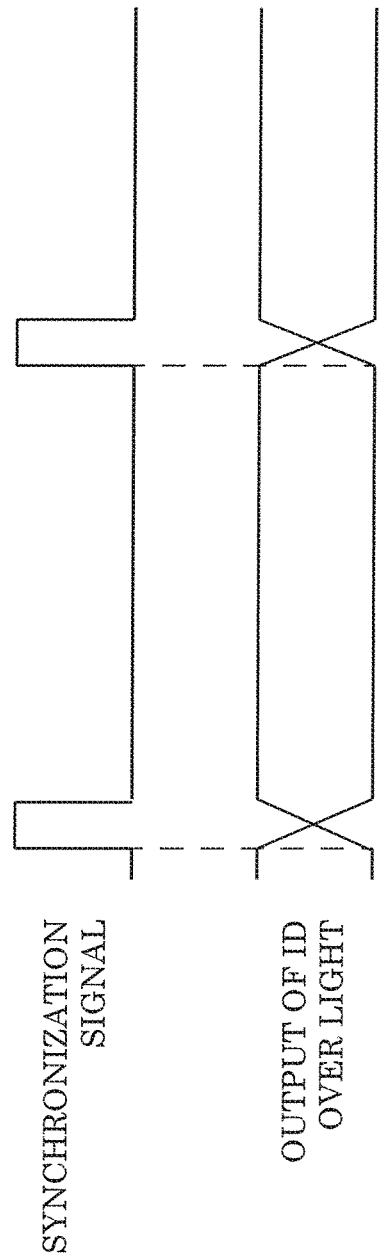
FIG. 12 illustrates the transmission timing of the synchronization signal and the ID according to Embodiment 3.

FIG. 12 shows the output and input timing of the synchronization signal and the transmission timing of the ID (internal ID or external ID) via light communication in light emitting device 10c according to Embodiment 3. In light emission system 15 according to Embodiment 3, as a result of the above operations, all of light emitting devices 10c included in light emission system 15 transmit IDs via light communication in synchronization with a synchronization signal. Here, the pulse interval of the synchronization signal is set to be longer than the output time of the ID.

As described above, modulation device 20c included in light emitting device 10c according to Embodiment 3 includes transceiver 29 that receives an input of the external ID into modulation device 20c and transmits a designated signal to an external destination. Control circuit 22c includes synchronization signal input terminal 23b for receiving an input, from an external source, of a synchronization signal that indicates timing for causing light source 40 to perform light communication, and synchronization signal output terminal 23c for outputting the synchronization signal to an external destination. When the external ID is received at transceiver 29, control circuit 22c causes transceiver 29 to transmit, to an external destination, the received external ID, and causes the received external ID to be input into modulator circuit 26 in synchronization with the synchronization signal input into synchronization signal input terminal 23b. When the external ID is not received at transceiver 29, control circuit 22c causes the internal ID stored in storage 25 to be transmitted to an external destination via transceiver 29 and causes the internal ID to be input into modulator circuit 26 in synchronization with outputting of a synchronization signal from synchronization signal output terminal 23c.

With this, the external ID input via transceiver 29 can be input into modulator circuit 26 after being processed by control circuit 22c, and the external ID input via transceiver 29 can be output as-is to an external destination via transceiver 29. Thus, when an external ID added with added information, such as a security code, is input via transceiver 29, the external ID can be input into modulator circuit 26 after the added information is removed from the external ID, and the external ID added with the added information can be output as-is to an external destination. As a result, even when a plurality of light emitting devices 10c are connected in series, added information added to the external ID is transmitted to each light emitting device 10c, and each light emitting device 10c transmits, via light communication, the original external ID removed of the added information.

Furthermore, by encrypting the transmission by transceiver 29, unauthorized interception of added information added to the external ID, such as a security code, can be reduced.

Moreover, modulation device 20c included in light emitting device 10c according to Embodiment 3 does not include a signal switch; rather control circuit 22c switches between IDs (external ID and internal ID) to be input into modulator circuit 26. With this, signal switching can be achieved with software, and as a result, hardware (signal switch) can be reduced and light emitting device 10c can be constructed at low cost.

Hereinbefore, the modulation device, light emitting device, and light emission system according to the present disclosure has been described based on Embodiments 1 through 3, but the present disclosure is not limited to Embodiments 1 through 3. Various modifications of Embodiments 1 through 3 as well as embodiments resulting from arbitrary combinations of elements of Embodiments 1 through 3 that may be conceived by those skilled in the art are intended to be included within the scope of the present disclosure as long as these do not depart from the essence of the present disclosure.

For example, light emitting device 10a according to Embodiment 1 does not include validity determiner 24 and signal switch 27 included in Embodiment 2, but may include at least one of validity determiner 24 and signal switch 27. This makes it possible to achieve a light emitting device or modulation device that can determine the validity of an input external ID and switch, via signal switch 27, which ID is to be input into modulator circuit 26 between the external ID and the internal ID.

Similarly, light emitting device 10c according to Embodiment 3 does not include signal switch 27 included in Embodiment 2, but may include signal switch 27. This makes it possible to achieve a light emitting device or modulation device that can switch, via signal switch 27, which ID is to be input into modulator circuit 26 between the external ID and the internal ID.

Moreover, in Embodiments 1 through 3, modulation devices 20a through 20c, light emitting devices 10a through 10c, and light emission system 15 are exemplified, but the present disclosure may be realized as a lighting equipment (or lighting device) including any one of modulation devices 20a through 20c and light source 40.

Moreover, in Embodiment 3, transceivers 29 included in the plurality of light emitting devices 10c (or plurality of modulation devices 20c) are connected in series, but may be connected in a bus configuration (in parallel). With this, transceivers 29 can simply fetch the external ID transmitted over the transmission path connected via the bus configuration, eliminating the need for processing for relaying the external ID.

Moreover, in Embodiment 3, the synchronization signals of the plurality of light emitting devices 10c (or plurality of modulation devices 20c) are connected via bus configuration, but the following sort of connection is also acceptable. In other words, a circuit configuration in which, when synchronization signal input terminal 23b receives an input (or receives the external ID), the input into synchronization signal input terminal 23b is short circuited into synchronization signal output terminal 23c. Synchronization signal output terminal 23c may be jointed to synchronization signal input terminal 23b of light emitting device 10c (or modulation device 20c) in a later stage of the circuitry.

Moreover, in light emitting device 10c according to Embodiment 3, when the external ID is received, control circuit 22c removes the security code added to the external ID and outputs the external ID to modulator circuit 26. However, control circuit 22c may modify the code added to the external ID into a code that is ignored (for example, changing all bits to "0") by modulator circuit 26, and output the external ID to modulator circuit 26. As a result, processing equal to inputting the external ID removed of the security code into modulator circuit 26 is achieved.

Figure 13:
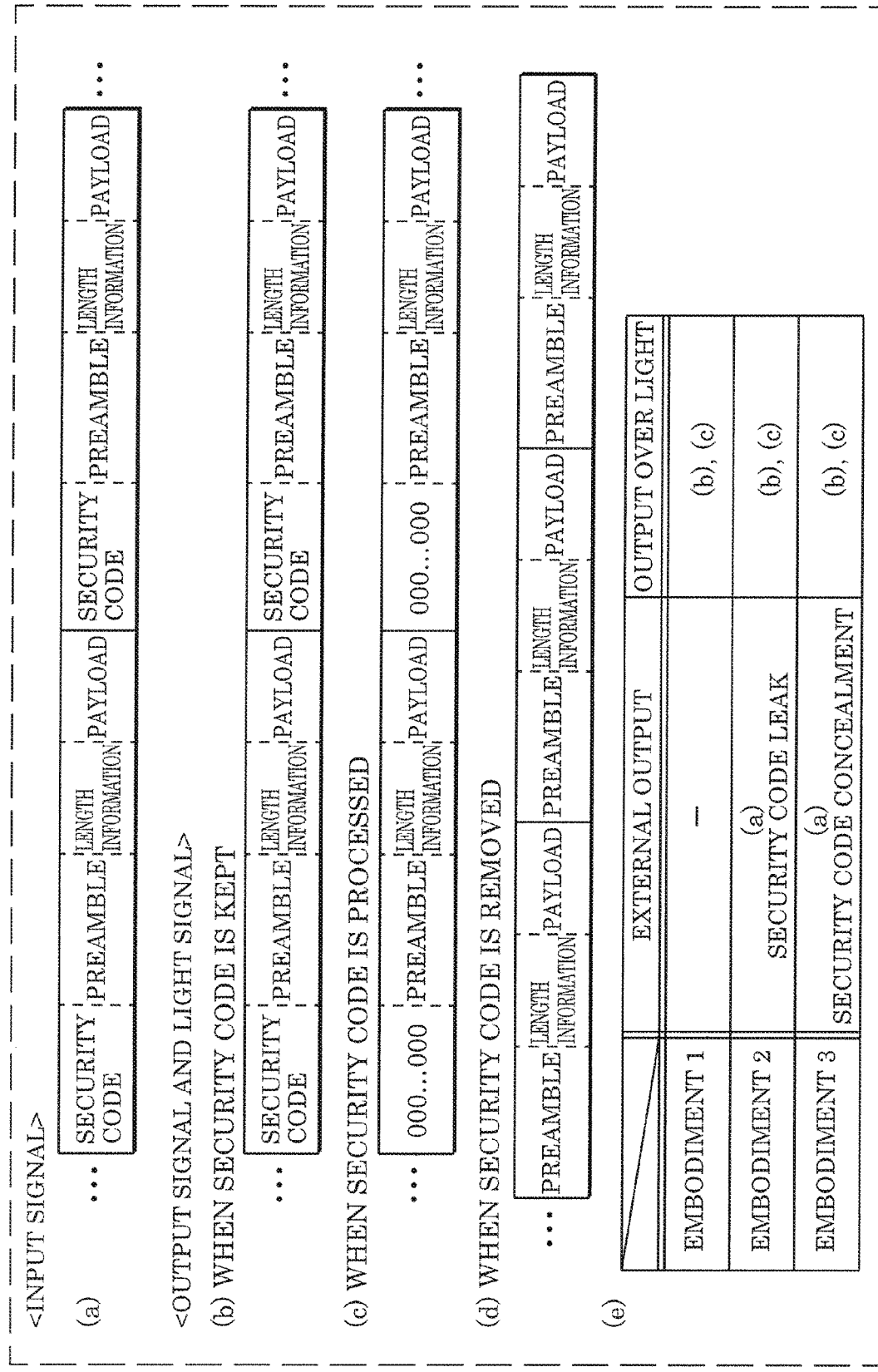
FIG. 13 illustrates an example related to handling the security code, when it is applied to Embodiments 1 through 3.

FIG. 13 illustrates an example related to handling the security code, when it is applied to Embodiments 1 through 3. In FIG. 13, (a) illustrates a format of the input signal (the signal input as the external ID), and (b) through (d) illustrate formats of output signals (signals output as the external ID) or light signals (signals transmitted via light communication). More specifically, in FIG. 13, (b) illustrates a format that is the same as the input signal (ID added with security data). In FIG. 13, (c) illustrates a format of an ID resulting from modifying the security code of the input signal to a code that is ignored by modulator circuit 26. In FIG. 13, (d) illustrates a format of an ID resulting from removing the security code from the input signal.

In FIG. 13, (e) illustrates formats (any of the formats illustrated in (b) through (d) of FIG. 13) of signals used for light signal output (input into the modulator circuit) and external output (output to another light emitting device) in Embodiments 1 through 3. As illustrated in (e) in FIG. 13, light emitting device 10a according to Embodiment 1 does not output an ID to an external destination since it does not include an ID transmission terminal, but as light signal output, the formats illustrated in (b) and (c) in FIG. 13 are applicable. Moreover, in light emitting device 10b according to Embodiment 2, the format illustrated in (a) in FIG. 13 is applicable as external output, and the formats illustrated in (b) and (c) in FIG. 13 are applicable as light signal output. However, the security code included in the ID output to an external destination can be intercepted. Moreover, in light emitting device 10c according to Embodiment 3, the format illustrated in (a) in FIG. 13 is applicable as external output, and the formats illustrated in (b) and (c) in FIG. 13 are applicable as light signal output. However, in the external output, since the ID is ciphered by transceiver 29, the security code included in the ID output to an external destination is encrypted. Thus, in terms of the security code being less susceptible to leaking out, Embodiments 1 and 3 are preferable.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A modulation device that causes a light source to perform light communication, the modulation device comprising:
a modulator circuit that modulates a magnitude of current supplied to the light source to cause the light source to perform light communication;
storage storing an internal ID, the internal ID being self-identification information; and
a control circuit that determines whether an external ID is input into the modulation device, the external ID being identification information supplied from an external source,
wherein when the control circuit determines that the external ID is input into the modulation device, the control circuit causes the external ID to be input, as a modulation signal, into the modulator circuit, and when the control circuit determines that the external ID is not input into the modulation device, the control circuit causes the internal ID stored in the storage to be input, as a modulation signal, into the modulator circuit, and the modulator circuit modulates the magnitude of current in accordance with the modulation signal input into the modulator circuit.

2. The modulation device according to claim 1, further comprising an ID transmission terminal that outputs, to an external destination, the modulation signal input into the modulator circuit.

3. The modulation device according to claim 1, further comprising a signal switch that selects one of the external ID and the internal ID and outputs the selected one of the external ID and the internal ID to the modulator circuit,
wherein when the control circuit determines that the external ID is input into the modulation device, the control circuit causes the signal switch to select the external ID and output the external ID to the modulator circuit, and when the control circuit determines that the external ID is not input into the modulation device, the control circuit causes the signal switch to select the internal ID and output the internal ID to the modulator circuit.

4. The modulation device according to claim 1, further comprising a transceiver that receives an input of the external ID into the modulation device and transmits a designated signal to an external destination,
wherein the control circuit includes a synchronization signal input terminal and a synchronization signal output terminal, the synchronization signal input terminal being for receiving an input, from an external source, of a synchronization signal that indicates timing for causing the light source to perform light communication, and the synchronization signal output terminal being for outputting the external synchronization signal to the external destination,
when the transceiver has received the external ID, the control circuit causes the transceiver to transmit, to the external destination, the external ID received by the transceiver and causes the external ID received by the transceiver to be input into the modulator circuit in synchronization with the synchronization signal input into the synchronization signal input terminal, and
when the transceiver has not received the external ID, the control circuit causes the transceiver to transmit, to the external destination, the internal ID stored in the storage and causes the internal ID stored in the storage to be input into the modulator circuit in synchronization with outputting of the synchronization signal from the synchronization signal output terminal.

5. The modulation device according to claim 1, wherein the control circuit further includes a validity determiner that determines whether the external ID input into the modulation device is a predetermined valid signal and, when the control circuit determines that the external ID is input into the modulation device, the control circuit causes the external ID to be input into the modulator circuit only when the external ID is determined to be valid by the validity determiner.

6. The modulation device according to claim 5, wherein the validity determiner determines the external ID to be a valid signal when the external ID includes a predetermined security code.

7. The modulation device according to claim 1, wherein when the control circuit determines that the external ID is input into the modulation device, the control circuit determines whether the external ID input into the modulation device is the same as the internal ID, and if the control circuit determines that the external ID input into the modulation device is the same, causes a signal for maintaining the current supplied to the light source at a constant magnitude to be input into the modulator circuit instead, of the external ID.

8. A light emitting device, comprising
a light source;
the modulation device according to claim 1, the modulation device causing the light source to perform light communication; and
a power supply that supplies power to the modulation device.

9. A light emission system, comprising a plurality of light emitting devices including at least a first light emitting device and a second light emitting device, each of the first light emitting device and the second light emitting device being the light emitting device according to claim 8, and the first light emitting device and the second light emitting device are connected together so as to cause the internal ID stored in the storage of the first light emitting device to be input into the modulator circuit of the first light emitting device and the internal ID to be input as an external ID in the second light emitting device.

* * * * *